United States Patent [19]
Larue

[11] Patent Number: 5,702,835
[45] Date of Patent: Dec. 30, 1997

[54] SEWAGE SLUDGE COMPOST BATTERY

[76] Inventor: Ross Carson Larue, 9661 Goodmon Rd., Groveport, Ohio 43125

[21] Appl. No.: 612,426

[22] Filed: Mar. 7, 1996

Related U.S. Application Data

[63] Continuation-in-part of Ser. No. 243,109, May 16, 1994, abandoned.
[51] Int. Cl.$^6$ ................................................. H01M 8/16
[52] U.S. Cl. ................................................................ 429/2
[58] Field of Search ............................ 429/2, 176; 71/12; 205/742, 745

[56] References Cited

U.S. PATENT DOCUMENTS

| | | | |
|---|---|---|---|
| 3,635,764 | 1/1972 | Setser et al. | 429/12 |
| 4,085,254 | 4/1978 | Atkins | 429/2 |
| 4,135,039 | 1/1979 | Jenkins | 429/27 |

OTHER PUBLICATIONS

Michelle Cardona Rosario, "Balto Energy, $2^{nd}$ Year of Research", Abstracts 45 $^{th}$ I.S.E.F., May 8–14, 1994.

*Primary Examiner*—Christopher G. Young

[57] ABSTRACT

Sewage Sludge Compost Batteries utilize Sewage Sludge Compost for electrical energy production. This is generated by biological oxidation/reduction reactions. By composting the sewage sludge, the physical and biological characteristics of the sewage sludge are altered, allowing utilization as a battery material. Sewage Sludge Compost also has many physical and biological characteristics that are different from raw and treated sewage. Electrical output is provided by the naturally occurring aerobic and anaerobic bacteria, Actinomycetes and fungi that are found in the Sewage Sludge Compost. Enhanced electrical output is achieved through the addition of various nitrogen compounds that include $NH_4Cl$ and urea. The absorbing quality of the composted sewage sludge controls any free liquid that may be added to foster the biological activity. Usable electric current is then produced when dissimilar electrodes, with an electromotive potential, are inserted. The Sewage Sludge Compost Battery provides an alternative use for sewage treatment waste by-products.

8 Claims, No Drawings

SEWAGE SLUDGE COMPOST BATTERY

CROSS-REFERENCE TO RELATED APPLICATION

This application is a continuation-in-part of application Ser. No. 08/243,109, filed May 16, 1994, now abandoned.

FIELD OF THE INVENTION

This invention relates to the production of electrical power in a battery utilizing biological matter and, in specific, sewage sludge that has been composted, hereafter referred to as Sewage Sludge Compost.

DESCRIPTION OF THE PRIOR ART

The production of electrical power using biological matter has been previously demonstrated by the teaching of Atkins, U.S. Pat. No. 4,085,254 and Setser et al., U.S. Pat. No. 3,635,764. Setser et al. utilizes waste water to generate power. Since waste water is typically dilute, it contains only 2–5% solids, only a very limited amount of electrical current can be obtained. Atkins teaches that a free liquid problem, in a biological matter apparatus for electrical power generation, can be solved through the use of finely divided cellulose material. Additionally, inoculation of the biological matter with a marine organism source is necessary in the Atkins apparatus.

This invention circumvents these problems through the use of Sewage Sludge Compost. Sewage Sludge Compost is approximately 16% liquid and 84% active biological material solids. Additionally, no inoculation is required since natural aerobic and anaerobic bacteria (both Mesophilic and Thermophilic), Actinomycetes (Thermophilic), and Fungi (Mesophilic and Thermophilic) exist in Sewage Sludge Compost, and are encouraged in the forced oxidation phase of composting. There have been seven species of bacteria, fourteen species of Actinomycetes and 34 species of fungi observed in Sewage Sludge Compost.

Another problem, although not stated but widely understood, is the health hazard posed by raw sewage waste water or sludge batteries. A sewage waste water or sludge battery contains pathogens, and this would pose a very real health concern if the battery leaks. Also, in raw waste water and sewage sludge, the accompanying odor would be a concern. Sewage Sludge Compost is pathogen free and odorless. This is due to the composting process. The pathogens are killed during the oxidation phase of composting since the temperature rises above 55° C. for at least three consecutive days. This is as required by the E.P.A.

SUMMARY OF THE INVENTION

Sewage Sludge Compost Batteries utilize Sewage Sludge Compost for electrical energy production. This is generated by biological oxidation/reduction reactions. By composting the sewage sludge, the physical and biological characteristics of the sewage sludge are altered, allowing utilization as a battery material. Sewage Sludge Compost also has many physical and biological characteristics that are different from raw and treated sewage. Electrical output is provided by the naturally occurring aerobic and anaerobic bacteria, Actinomycetes and fungi that are found in the Sewage Sludge Compost. Enhanced electrical output is achieved through the addition of various nitrogen compounds that include $NH_4Cl$ and urea. The absorbing quality of the composted sewage sludge controls any free liquid that may be added to foster the biological activity. Usable electric current is then produced when dissimilar electrodes, with an electromotive potential, are inserted. The Sewage Sludge Compost Battery provides an alternative use for sewage treatment waste by-products.

DESCRIPTION OF THE PREFERRED EMBODIMENTS

This invention utilizes commercially produced Sewage Sludge Compost. The compost is produced throughout the United States. The two widely used production methods are the aerated static pile procedure, and the enclosed vessel procedure. In the aerated static pile procedure, one part sewage sludge is mixed with four parts of biodegradable material, such as wood chips, to allow aeration. It is then windrowed over aeration tiles, which have fan forced natural air. This speeds the oxidation reaction, and as temperatures rise above 55° C., the pathogens are killed. Additionally, as the temperature rises, aerobic bacteria, Actinomycetes and fungi are fostered. This method requires approximately thirty days. If fan forced natural air is not utilized, an additional thirty to sixty days would be required to produce the compost. The enclosed vessel method is quicker, since the heat is not lost to the atmosphere. This method requires fourteen days in the vessel. Additionally, the same thirty to sixty days would be required if natural air is utilized without fans.

In both methods, the Sewage Sludge Compost is screened, with the large biodegradable filler (usually wood chips) being removed for subsequent use. Approximately 25% of the filler remains in the finished Sewage Sludge Compost.

A new commercially developed process utilizes a non-biodegradable material as the filler. This is commonly rubber tire chips. All of the filler in this process is recovered for subsequent use. This results in a pure Sewage Sludge Compost.

These two composted products have different physical characteristics compared to raw sewage, treated sewage and sewage sludge. These physical characteristics are their consistency, and their ability to absorb liquids. This provides for better applications to battery use. The composted sewage sludge with the small amount of biodegradable filler that goes through the screen, along with the bacteria, Actinomycetes and fungi, is the active biological matter of the first feature of the invention. The pure Sewage Sludge Compost along with the bacteria, Actinomycetes and fungi is the active biological matter of the second feature of the invention. Each of these composted materials may be enhanced through addition of various nitrogen compounds, including $NH_4Cl$ and urea.

These composted materials are used to produce electrical power in a single cell. The electrodes used in the research of this invention were a carbon rod (the cathode where reduction occurs) and a zinc plate (the anode where oxidation occurs). This oxidation/reduction reaction results in an electromotive potential between the electrodes that yields up to 1.5 volts. The milliamperage readings of plain Sewage Sludge Compost and enhanced Sewage Sludge Compost varied. A reading of up to 150 milliamps was achieved with plain Sewage Sludge Compost. Readings of up to 250 milliamps and 350 milliamps were achieved with enhanced Sewage Sludge Compost, utilizing $NH_4Cl$ and urea as the nitrogen enhancing agents, respectively.

There are four features of the present invention drawn to the electrical output of the Sewage Sludge Compost Battery. These four features should not be considered as the only means of using Sewage Sludge Compost for battery power, but only serve as examples.

The first feature is a single cell battery utilizing Sewage Sludge Compost with water added to the point where any additional water would result in excess free liquid (moist Sewage Sludge Compost). Two dissimilar electrodes with electromotive potential are inserted into the moist Sewage Sludge Compost. An example of the electrodes would be carbon for the cathode and zinc for the anode.

The second feature is a substitution of standard dry cell material with Sewage Sludge Compost in a common non-alkaline battery. Up to 4/5 of the standard dry cell material can be replaced with Sewage Sludge Compost without any loss of electrical output. Electrical output was enhanced with Sewage Sludge Compost to the point of each material being present in equal amounts.

The third feature is an enhanced Sewage Sludge Compost battery obtained through use of Sewage Sludge Compost and water with an added nitrogen source such as $NH_4Cl$ or urea. This enables the biological activity of the battery to be increased with longer electrical output.

The fourth feature is a renewable Sewage Sludge Compost Battery. When there is a loss in electrical output, the biological activity in the depleted battery can be increased through addition of a water and nitrogen source solution.

What is claimed is:

1. A biological battery comprising two dissimilar electrodes, with an electromotive potential, inserted into biological matter, wherein said biological matter contains as a primary ingredient moist Sewage Sludge Compost and as a secondary ingredient composted biodegradable filler that remains from the sewage sludge composting process.

2. The biological battery of claim 1 wherein said biological matter further comprises a nitrogen compound.

3. The biological battery of claim 2 wherein the nitrogen compound is $NH_4Cl$ or urea.

4. A biological battery comprising two dissimilar electrodes, with an electromotive potential, inserted into biological matter, wherein said biological matter contains as a primary ingredient pure moist Sewage Sludge Compost.

5. The biological battery of claim 4 wherein said biological matter further comprises a nitrogen compound.

6. The biological battery of claim 5 wherein the nitrogen compound is $NH_4Cl$ or urea.

7. A process of renewing biological activity in the biological battery of claim 1 by adding a water and nitrogen compound solution to said biological matter when loss of electrical output is exhibited.

8. A process of renewing biological activity in the biological battery of claim 4 by adding a water and nitrogen compound solution to said biological matter when loss of electrical output is exhibited.

* * * * *